United States Patent Office 2,753,934
Patented July 10, 1956

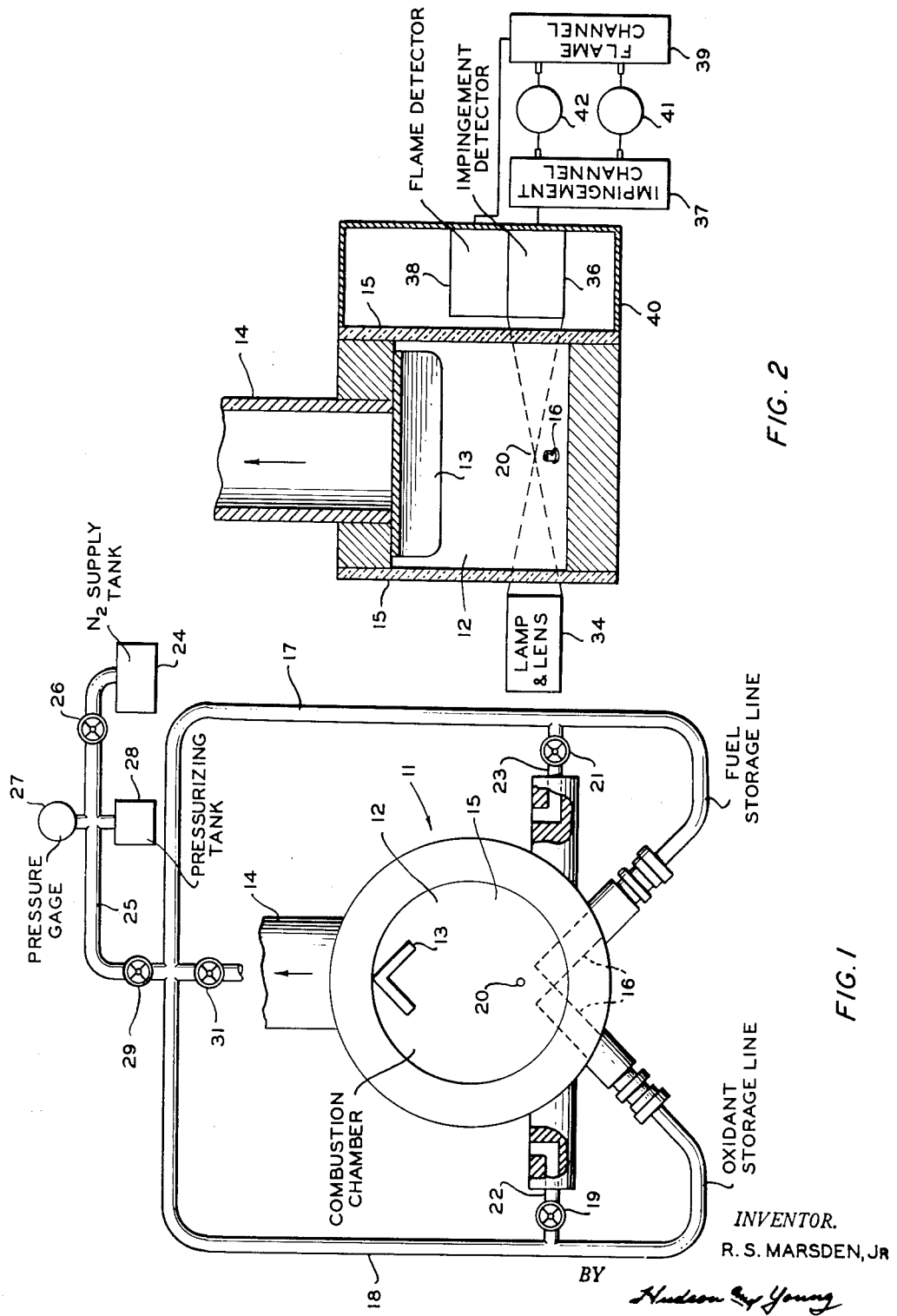

2,753,934

APPARATUS AND METHOD FOR THE MEASUREMENT OF IGNITION DELAY

Ross S. Marsden, Jr., Bartlesville, Okla., assignor to Phillips Petroleum Company, a corporation of Delaware Application February 12, 1953, Serial No. 336,477

13 Claims. (Cl. 161—15)

This invention relates to the measurement of time intervals. In one of its more specific aspects, this invention relates to an apparatus for measuring ignition delay. In another specific aspect, this invention relates to a method for measuring ignition delay. In another specific aspect, the invention pertains to a method and apparatus for measuring the time interval between the impingement and ignition of a hypergolic fuel and an oxidant.

Ignition delay of a bi-propellant fuel is defined as the time between impingement or initial contact of fuel and oxidant and the appearance of flame. Stated differently, it is a measure of the time required for pre-reactions to increase the energy of the system to a level of intense reaction, i. e., ignition. As long ignition delays are the cause of hard starts, rough burning, and, frequently, destructive explosions, they are highly undesirable. The maximum ignition delay that can be tolerated in a rocket seems to be a matter of opinion, as well as a function of rocket chamber design, but is in the neighborhood of from 5 to 150 milliseconds. Because of its relation to safety of operation, and since in short burning duration rockets it may affect overall performance, the measurement of ignition delay is important in the preliminary laboratory evaluation of hypergolic propellants.

Although considerable work has been done on the measurement of ignition delay, there is at the present time no standardized technique. Numerous techniques have been used for measuring the initial impingement and the sustained combustion which define ignition delay. Actual impingement should be sensed if possible, and one possible but sometimes impractical method is to detect impingement by electrical conductivity through the streams. An approximation of the instant of impingement is sometimes made by sensing the opening of nozzle flow valves and recording the instant the flow starts instead of actual impingement. Common methods of recording the onset of combustion are by sensing the appearance of flame, a given pressure rise or a given degree of ionization. The advantage of these methods is that the instrumentation is relatively inexpensive, but they have the disadvantage of oftentimes giving false indications before sustained combustion starts. A reliable and simple method of obtaining both impingement and combustion instants is by the use of a high speed motion picture camera; however, the high price of this equipment often prohibits its use.

The object of this invention will be attained by the various aspects of the invention.

It is an object of the present invention to provide a means and method of measuring the ignition delay of bi-propellants. It is also an object of this invention to provide an apparatus which gives an accurate and immediate indication of the ignition delay of bi-propellants. It is a further object of the invention to provide an apparatus for measuring ignition delay which combines the features of dependability, simplicity, accuracy and inexpensiveness. Other objects of the invention will become apparent from the accompanying disclosure.

My invention provides a method and means of introducing separately a hypergolic fuel and an oxidant into a combustion chamber and determining the time interval between the impingement of the fuel and oxidant and their ignition. The two streams, one of fuel and the other of oxidant, upon impingement within the combustion chamber interrupt a beam of light directed upon a photo cell. A signal is thereby produced by the photo cell which is fed into a timing circuit, thus causing a timer to start counting time. When ignition occurs, the flash causes a second photo cell to produce a signal which causes the timer to stop counting time. An interval timer of the type disclosed in the application of H. M. Richardson, Serial No. 336,480, filed February 12, 1953, may be advantageously employed with this invention, and may be referred to for a fuller explanation of those features of construction and operation which are not a part of the present invention.

For a better understanding of the invention, reference should be had to the accompanying drawings and descriptive matter in which I have illustrated and described a preferred embodiment of my invention.

In the drawing:

Figure 1 is a schematic drawing of the ignition delay system showing a front view of the combustion chamber and fluid supply system.

Figure 2 is a schematic drawing showing a side view of the combustion chamber in section and a block diagram of the instrumentation.

Referring in detail to Figure 1, numeral 11 designates an elongated cylindrical chamber enclosing a combustion chamber 12. A baffle 13 is positioned immediately below gas outlet 14 which is located in the upper portion of the chamber and operates as an exhaust for combustion gases. A glass window 15 serves as a closure member for one end of the cylinder, and an identical glass window is located at the opposite end of the cylinder. Injection nozzles 16 are directed upwardly into the lower portion of the chamber and are connected to fuel storage line 17 and oxidant storage line 18. Numeral 20 indicates the focal point of a light source to be discussed hereinafter. Lines 17 and 18 extend vertically upward from the nozzles to points substantially above the chamber at which points the lines turn and intersect at a point above the chamber. Filler lines 22 and 23 are provided with needle valves 19 and 21, respectively, and feed into lines 17 and 18 at points in the vertical portions of these latter lines. A nitrogen supply tank 24 is connected by line 25 to the intersection of lines 17 and 18. Line 25 has associated therewith a pressure regulating valve 26, a pressure gage 27 and a pressurizing tank 28, and a solenoid valve 29. A bleed valve 31 is provided at the intersection of lines 17 and 18.

Referring to Figure 2, identical numerals have been employed to designate elements corresponding to those shown in Figure 1. Numeral 34 designates a lamp and lens located adjacent to glass window 15. Photocell 36 is positioned adjacent the other glass window 15 and in a position to detect a beam of light from lamp 34. Photocell 38 is located above photocell 36 and in a position to detect the flame of ignition. Colored glass filters, not shown, may be placed in front of photocells 36 and 38 and lamp 34 so that photocell 36 is sensitive only to the light from lamp 34 and photocell 38 is sensitive only to the flame of ignition. The point of impingement of oxidant and fuel is just below the focal point 20 of the lamp 34. Photocells 36 and 38 are labelled in the drawing as an impingement detector and a flame detector, respectively, and are shown as being supported by frame 40. Numerals 37 and 39 designate an impingement channel and a flame channel of an electrical circuit, respectively, each channel being connected to the appropriate photocell.

Numerals 41 and 42 designate revolving drums covered with spark sensitive paper, one of the drums rotating at a greater rate of speed than the other. Numerals 37, 39, 41 and 42 constitute an interval timer as described in the application of H. M. Richardson, as mentioned above.

In the operation of the apparatus, referring to Figures 1 and 2, lamp 34 is lighted and its beam of light is focused at a point 20 just above the point of impingement of the hypergolic fuel and oxidant. When fuel and oxidant are not being injected into the chamber, the beam of light of the lamp will fall upon photocell 36, but not upon photocell 38. Colored glass filters may be placed in front of photocells 36 and 38 and lamp 34 to positively ensure that none of the light from 34 is received by photocell 38. A hypergolic fuel is introduced into fuel storage line 17 through filler line 23, the rate of introduction being controlled by needle valve 21. An oxidant is similarly introduced into oxidant storage line 18 through filler line 22 and needle valve 19. Since nozzles 16 are directed upward, the fluid lines may be filled by gravity practically to the tips of the nozzles. After introduction of fuel and oxidant, needle valves 19 and 21 are closed. The hypergolic fuel and oxidant are pressurized through a valve 29, which may be a single quick-acting solenoid valve, from a common large capacity surge chamber or pressurizing tank 28 filled with nitrogen, or other pressurizing fluid inert to the materials used, to the desired injection pressure, as controlled by pressure regulating valve 26 and as indicated by pressure gage 27, from a supply tank 24. A bleed valve 31 at the intersection of the fuel and oxidant pressurizing lines is provided to prevent compression of the column of gas between the two sides during filling, which may cause bubbles in the second fluid admitted or cause the first fluid admitted to prematurely enter the combustion chamber. When valve 29 is opened, hypergolic fuel and oxidant, because of the pressure exerted thereon by the nitrogen gas, are injected simultaneously, or practically so, through nozzles 16 into combustion chamber 12. The two streams of fluid thus injected impinge at a point just below the focal point 20 of lamp 34, thus interrupting the beam of light which has been focused upon photocell 36. The interruption of the beam of light occurs only upon impingement of the two streams, thus compensating for any differences in the time of injection of the two fluids. Upon interruption of the beam of light, photocell 36 produces a signal which starts the interval timer, represented by numerals 37, 39, 41 and 42, counting time. When ignition occurs within combustion chamber 12, the flash is detected by photocell 38, producing a signal which causes the interval timer to stop counting time. In the operation of the interval timer, the signal produced by photocell 36 upon impingement of the fluids is amplified in impingement channel 37 and through a sparking process marks a point on each of the strips of spark sensitive paper covering revolving drums 41 and 42. These two points indicate the beginning of the interval of time to be measured. Similarly, the signal produced by photocell 38 upon ignition of the fluids is amplified in flame channel 39 and through a sparking process marks a point on each of the same strips of spark sensitive paper which indicate the end of the time interval to be measured. Drums 41 and 42 are rotating at different known speeds so that the slow drum will give a coarse reading and the fast drum a vernier reading. By the utilization of suitable calibrated scales, it is possible to read the ignition delay directly from the drums.

Although I have described a preferred embodiment of my invention in rather definite terms, it is to be understood that numerous alterations in the details of construction and the combination and arrangement of parts may be resorted to without departing from the spirit and the scope of the invention. For instance, while photocell 38 has been described as positioned above photocell 36, it is obvious that a number of arrangements can be employed to detect impingement and ignition. Further, by designing a circuit so that a decrease in light starts the interval timer and an increase in light stops the timer, one photocell can be used to sense both impingement and ignition. While photocells have been utilized in the practice of this invention, other types of detectors as pressure sensitive devices, thermocouples of thermistors may be employed. Various modifications of the invention will become apparent to those skilled in the art. The illustrative details disclosed are not to be construed as imposing unnecessary limitations upon the invention.

I claim:

1. A method for measuring ignition delay of bi-propellants which comprises producing a first electrical signal upon contact of a hypergolic fuel and an oxidant; recording the time of said first signal; producing a second electrical signal upon ignition of said fuel and oxidant; and recording the time of said second signal.

2. A method for measuring ignition delay of bi-propellants which comprises introducing separate streams of a hypergolic fuel and an oxidant into a combustion chamber; producing a first electrical signal upon contact of said fuel and said oxidant; recording the time of said first signal; producing a second electrical signal upon ignition of said fuel and oxidant; and recording the time of said second signal.

3. A method for measuring ignition delay of bi-propellants which comprises passing a beam of light through a combustion chamber; directing said beam upon a first photocell; injecting separate streams of hypergolic fuel and oxidant into said chamber, said streams upon impingement interrupting said beam of light; recording the time of the signal produced by said first photocell by the interruption of said beam of light; placing a second photocell in a position to receive the flash of ignition of said fuel and oxidant; and recording the time of the signal produced by said second photocell by said flash of ignition.

4. A method for measuring the time interval between the impingement and ignition of a hypergolic fuel and an oxidant which comprises passing a beam of light through a glass combustion chamber; directing said beam upon a first photocell located outside said chamber; introducing said fuel and said oxidant into said chamber in separate streams so that when said streams meet said beam of light is interrupted; recording the time of the signal produced by said first photocell; directing the flash of ignition of said fuel and said oxidant upon a second photocell located outside said chamber; and recording the time of the signal produced by said second photocell.

5. A method for measuring ignition delay of bi-propellants which comprises passing a beam of light through a glass combustion chamber; directing said beam of light upon a first photocell; introducing said fuel and said oxidant into said chamber in separate streams so that upon impingement of said streams said beam of light is interrupted; utilizing the signal produced by said first photocell to start a timer counting time; positioning a second photocell so as to receive the flash of ignition of said fuel and oxidant; and utilizing the signal produced by said second photocell to stop said timer counting time.

6. An apparatus for measuring ignition delay of bi-propellants comprising in combination an enclosed chamber having a gas outlet and two fluid inlets; a light source positioned outside of and adjacent a glass window in said chamber, said light source having its focal point immediately above the point of impingement of fluids introduced through said fluid inlets; a first photocell positioned adjacent a second glass window in said chamber and directly opposite said light source; a second photocell positioned adjacent said second window and spaced from said first photocell; and an interval timer electrically connected to said first and second photocells and adapted to start operating in response to a signal from said first photocell and to stop operating in response to a signal from said second photocell.

7. An apparatus for measuring ignition delay of bipropellants comprising in combination an enclosed chamber; gas outlet means in said chamber; fluid inlet means in said chamber; a light detecting means in visual communication with the interior of said chamber and with a light source, said light source having its focal point immediately above the point of impingement of fluids introduced through said fluid inlet means; and means associated with said light detecting means for measuring the time intervals between variations in light conditions as indicated by said light detecting means.

8. An apparatus for measuring ignition delay of bipropellants comprising in combination a horizontally elongated cylindrical chamber having glass closure members at either end; a gas outlet in the upper portion of and intermediate the ends of said chamber; a baffle positioned within said chamber immediately below said gas outlet; fluid inlets in the lower portion of and intermediate the ends of said chamber, said inlets comprising nozzles directed upwardly into the interior of said chamber and radially disposed so that fluids injected therethrough will impinge in said chamber; a light source and lens positioned outside of and adjacent one end of said chamber, said light source having its focal point immediately above the point of impingement of fluids introduced through said fluid inlets; a first photocell positioned outside of and adjacent the other end of said chamber so that said photocell intercepts the beam of light from said light source; and a second photocell spaced from said first photocell and in visual communication with the interior of said chamber.

9. The apparatus of claim 8 wherein said first and second photocells are electrically connected to an interval timer which starts counting time in response to a signal from said first photocell and which stops counting time in response to a signal from said second photocell.

10. The apparatus of claim 9 wherein said fluid inlets are associated with a fluid supply system which comprises a fuel storage line connected to one of said nozzles and an oxidant storage line connected to another of said nozzles, said lines extending upwardly from said nozzles to points substantially above said chamber at which points said lines turn and intersect at a point above said chamber; filler lines equipped with valves connected to the vertical portions of each of said storage lines; a gas source and a line leading from said source to the intersection of said storage lines, said line having associated therewith a pressure regulating valve, a pressure gage and pressurizing tank, and a solenoid valve; and a bleed valve at the intersection of said storage lines.

11. An apparatus for measuring ignition delay of bipropellants comprising in combination, a chamber; means to introduce a stream of fuel into said chamber; means to introduce a stream of an oxidant into said chamber in a direction to impinge with the fuel introduced into said chamber; gas outlet means; a radiation source; means to focus radiation from said source into said chamber; a first radiation detector positioned to intercept radiation from said source; a second radiation detector spaced from said first detector; and means responsive to said first and second detectors to indicate the time interval said second detector is actuated following actuation of said first detector.

12. An apparatus for measuring ignition delay of bipropellants comprising in combination, a chamber; gas outlet means; means to introduce a stream of fuel into said chamber; means to introduce a stream of an oxidant into said chamber in a direction to impinge with the fuel introduced into said chamber; a light source; means to focus light from said source into said chamber so that the focal point of the light is immediately above the point of impingement of the fuel and oxidant streams; a first photocell positioned to intercept light from said source; a second photocell spaced from said first photocell; and an interval timer electrically connected to said first and second photocells and adapted to start operating in response to a signal from said first photocell and to stop operating in response to a signal from said second photocell.

13. An apparatus for measuring ignition delay of bipropellants comprising in combination, a chamber; a radiation source; means to focus radiation from said source into said chamber; a first radiation detector positioned to intercept radiation from said source; means to introduce a stream of fuel into said chamber; means to introduce a stream of an oxidant into said chamber in a direction to impinge with the fuel introduced into said chamber, said impingement of the fuel and the oxidant interrupting the radiation on the first radiation detector; a second radiation detector spaced from said first detector; and means responsive to said first and second detectors to indicate the time interval said second detector is actuated following actuation of said first detector.

References Cited in the file of this patent

UNITED STATES PATENTS

| | | |
|---|---|---|
| 2,442,690 | Hoffman et al. | June 1, 1948 |
| 2,500,334 | Zucrow | Mar. 14, 1950 |
| 2,577,408 | Dobson | Dec. 4, 1951 |
| 2,606,421 | Goddard | Aug. 12, 1952 |

OTHER REFERENCES

"An Apparatus for the Measurement of Ignition Delays of Self-Igniting Fuels," by J. D. Broatch, "Fuel," vol. 29, 1950, pages 106–109.

Article by S. Gunn, Journal of American Rocket Society, January–February 1952, pages 33–38.